(12) United States Patent
Doumaux et al.

(10) Patent No.: US 7,476,271 B2
(45) Date of Patent: Jan. 13, 2009

(54) INKJET INK SET

(75) Inventors: Howard A. Doumaux, San Diego, CA (US); David M. Mahli, San Diego, CA (US); Kathryn Nifong Burns, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/496,186

(22) Filed: Jul. 31, 2006

(65) Prior Publication Data

US 2008/0022890 A1    Jan. 31, 2008

(51) Int. Cl.
*C09D 11/02* (2006.01)
*B41J 2/01* (2006.01)

(52) U.S. Cl. .................... 106/31.6; 347/100
(58) Field of Classification Search ............... 106/31.6; 347/100
See application file for complete search history.

(56) References Cited

U.S. PATENT DOCUMENTS

| | | | |
|---|---|---|---|
| 4,705,572 A * | 11/1987 | Spietschka et al. | 106/493 |
| 5,035,747 A * | 7/1991 | Dietz et al. | 106/495 |
| 6,231,655 B1 | 5/2001 | Marritt | |
| 6,648,954 B2 | 11/2003 | Uemura et al. | |
| 6,702,883 B1 * | 3/2004 | Sano et al. | 106/31.6 |
| 6,715,869 B1 * | 4/2004 | Reem et al. | 347/100 |
| 6,719,422 B2 | 4/2004 | Wu et al. | |
| 6,749,675 B2 | 6/2004 | Momose | |
| 6,811,597 B2 | 11/2004 | Oki et al. | |
| 6,821,330 B1 | 11/2004 | Sano et al. | |
| 6,874,870 B2 | 4/2005 | Ishikawa et al. | |
| 6,924,035 B2 | 8/2005 | Auweter et al. | |
| 6,988,795 B2 | 1/2006 | Doi | |
| 6,997,979 B2 | 2/2006 | Bauer et al. | |
| 7,004,579 B2 | 2/2006 | Sato et al. | |
| 7,037,957 B2 | 5/2006 | Ninomiya et al. | |
| 7,056,378 B2 * | 6/2006 | Weber et al. | 106/493 |
| 7,056,972 B2 | 6/2006 | Nakazawa et al. | |
| 2003/0116055 A1 * | 6/2003 | Kubota et al. | 106/31.27 |
| 2004/0237838 A1 | 12/2004 | Yatake et al. | |
| 2005/0113476 A1 | 5/2005 | Akiyama et al. | |
| 2006/0023043 A1 | 2/2006 | Ishibashi et al. | |
| 2006/0025497 A1 | 2/2006 | Ushirogouchi et al. | |
| 2006/0074146 A1 | 4/2006 | Sato et al. | |
| 2006/0082630 A1 | 4/2006 | Kato et al. | |
| 2006/0117990 A1 * | 6/2006 | Foster | 106/31.27 |

FOREIGN PATENT DOCUMENTS

| | | |
|---|---|---|
| EP | 1645604 | 12/2006 |
| WO | 200608300 | 8/2006 |
| WO | 2007060254 | 5/2007 |

OTHER PUBLICATIONS

U.S. Appl. No. 11/290,094, filed Nov. 30, 2005, Doumaux et al.

* cited by examiner

*Primary Examiner*—Helene Klemanski

(57) ABSTRACT

An inkjet ink set includes a red ink and an other ink. The red ink consists essentially of an ink vehicle and an effective amount of pigment red 168. The other ink includes an ink vehicle and an effective amount of at least one other pigment.

21 Claims, No Drawings

INKJET INK SET

BACKGROUND

The present disclosure relates generally to inkjet ink sets.

Secondary color inks have been added to ink sets in an effort to increase the color gamut of the printing system in which the ink sets are used. Many pigments included in secondary color inks are capable of forming images that exhibit some relatively good properties, while at the same time exhibit other relatively poor properties. As examples, some pigments generate images having good gloss and chroma, but relatively poor lightfastness (e.g., window, indoor, or outdoor) and/or poor ozonefastness; and other pigments generate images having poor gloss and chroma, but exhibit relatively good lightfastness and/or ozonefastness.

For example, secondary color inks based upon orange or red pigments generally deliver relatively good gloss and chroma. However these inks may also exhibit relatively poor lightfastness (i.e., color fade resulting from light exposure) and ozonefastness (i.e., color fade resulting form air exposure). Printed images formed from these inks tend to suffer from red, green, blue or other color density loss (i.e., fade) upon exposure to various forms of light (e.g., indoor, window, etc.) or to air over time. Alternatively, orange and orange-red inks formed with magenta and yellow pigments may be formulated to have good lightfastness. However, these inks also tend to exhibit lower chroma or pure color than inks based on a secondary color pigment. The mixed pigment inks (e.g., those formed with magenta and yellow pigments) generally do not supply additional gamut to the printing system in which they are incorporated.

DETAILED DESCRIPTION

Embodiments of the ink set disclosed herein advantageously include a scarlet ink and at least one other ink (e.g., a yellow ink or a gray ink). The inks of the ink set provide an enhanced yellow-red or scarlet gamut for the printing system in which they are used. Furthermore, the inks of the ink set (e.g., scarlet and yellow inks, or scarlet and gray inks) may be combined to produce secondary colors (e.g., various shades of brown, red and orange) that exhibit substantially balanced lightfastness, enhanced chroma, substantially balanced ozonefastness, or various combinations thereof.

The term "lightfastness" as used herein refers to the durability of a print when exposed to light. Generally, when an ink is referred to as being "lightfast", it has fade resistance. The term "window" when used in combination with lightfastness generally refers to more extreme lighting conditions, non-limiting examples of which include exposure to direct or indirect sunlight filtered by glass. The term "indoor" when used in combination with lightfastness generally refers to less extreme lighting conditions, a non-limiting example of which includes exposure to direct or indirect artificial lighting. The term "outdoor" when used in combination with lightfastness generally refers to exposure to direct sunlight without any filters.

The term "ozonefastness" as used herein refers to the durability of a print when exposed to air without intervening isolating (from air) media. Generally, when an ink is referred to as being "ozonefast", it has fade resistance.

Balanced lightfastness and/or ozonefastness may be desirable in a photographic system for several reasons. Ideally, the life of the various component colors should fail at substantially the same time to avoid undesirable color change. Furthermore, it may be desirable to avoid developing and paying for higher performance colorants that do not fail first, if the remainder of the colorants used fail before the higher performance colorants. For example, if a higher performance colorant and an average performance colorant are used to form a printed image, the resulting printed image is as good as the colorant that fades first. As such, it may be undesirable to use a more expensive, higher performance material that is potentially more difficult to work with, and which delivers substantially no benefit in terms of increased lightfastness or ozonefastness.

Embodiment(s) of the ink set disclosed herein include at least two inks. One of the inks is a scarlet ink including an ink vehicle and an effective amount of pigment red 168 (which is commercially available as Hostaperm® Scarlet GO or transparent from Clariant International Ltd., located in Muttenz Switzerland). The other of the inks (e.g., a yellow ink or a gray ink) includes an ink vehicle and an effective amount of at least one other pigment.

Other embodiment(s) of the ink set disclosed herein also include at least two inks. One of the inks is a red ink including an ink vehicle and an effective amount of pigment red 254. The other of the inks is a neutral gray ink including an ink vehicle and effective amounts of black pigment, cyan pigment, and magenta pigment.

As used herein, the singular forms of the articles "a," "an," and "the" include plural referents unless the content clearly dictates otherwise. Further, the phrase "effective amount," as used herein, refers to the minimal amount of a substance and/or agent, which is sufficient to achieve a desired and/or required effect. For example, an effective amount of an "ink vehicle" is the minimum amount required in order to create an ink composition, while maintaining properties suitable for effective inkjet printing.

"Liquid vehicle" or "ink vehicle," as used herein, refers to the vehicle in which colorant is placed to form an ink. A wide variety of ink vehicles may be used with the inks, systems, and methods according to embodiments disclosed herein. It is to be understood that the scarlet ink, the red ink, and/or other ink in the ink set disclosed herein may be aqueous based inks, organic based inks, or combinations thereof. Examples of suitable ink vehicles include, but are not limited to water soluble polymers, surfactants (e.g., non-ionic surfactants, ethoxylated nonionic fluorosurfactants, etc.), solvents, co-solvents, buffers, biocides, sequestering agents, viscosity modifiers, surface-active agents, chelating agents, resins, and/or water, and/or combinations thereof.

In an embodiment, both the scarlet ink and the other ink have an ink vehicle including water soluble polymers, SUR-FYNOL 440 (a non-ionic surfactant commercially available from Air Products and Chemicals, Inc. located in Allentown, Pa.), glyceryl polyoxyethyl ether, pyrrolidone, glycerol, diethylene glycol, 1,2-hexanediol, Zonyl® FSO (an ethoxylated nonionic fluorosurfactant commercially available from Dupont located in Wilmington, Del.), a biocide (a non-limiting example of which is a solution of 1,2-benzisothiazolin-3-one), triethanolamine, and combinations thereof.

As previously stated, the scarlet ink of one embodiment of the ink set includes an effective amount of pigment red 168. In an embodiment, the effective amount of pigment red 168 in the scarlet ink has a pigment load sufficient to provide an absorbance maxima, ranging from about 0.075 to about 1.2 at a 1:2,500 dilution of the scarlet ink, at a wavelength maxima ranging from about 480 nm to about 580 nm. Furthermore, the pigment red 168 may be in the form of solid pigment particles.

In another embodiment, effective amounts of other pigments (in addition to the pigment red 168) may be added to the ink vehicle of the scarlet ink. Non-limiting examples of such other pigments include yellow pigment(s), scarlet pigment(s), magenta pigment(s), or combinations thereof.

In embodiments including the scarlet ink with pigment red 168, the other ink of the ink set includes an effective amount of at least one pigment other than pigment red 168. The pigment(s) and the effective amount(s) pigment(s) selected for the other ink depend, at least in part, on the desirable hue for the other ink. As non-limiting examples, the other ink is a yellow ink or a gray ink.

In an embodiment of the ink set (including the pigment red 168 scarlet ink) in which the other ink is a yellow ink, the other pigment is selected from pigment yellow 128, pigment yellow 213, pigment yellow 93, pigment yellow 155, pigment yellow 110, pigment yellow 150, pigment yellow 151, and combinations thereof. As previously indicated, the effective amounts of the pigment(s) used to form the yellow ink may depend on the desired shade (e.g., light yellow, medium yellow, dark yellow) of the resulting ink. In an embodiment, the effective amount(s) of the pigment(s) in the yellow ink generally has a pigment load sufficient to provide an absorbance maxima ranging from about 0.200 to about 4.000 at a 1:2,500 dilution of the yellow ink, at a wavelength maxima ranging from about 320 nm to about 480 nm.

One embodiment of the inkjet ink set includes the scarlet ink and a yellow ink based on pigment yellow 128, pigment yellow 213, pigment yellow 110, pigment yellow 150, and/or pigment yellow 151. When printed, the combination of the inks results in a red, red-orange, or orange colored image having enhanced chroma, substantially balanced window and indoor lightfastness, ozone fastness, or combinations thereof.

Another embodiment of the inkjet ink set includes the scarlet ink and a yellow ink based on pigment yellow 93 and/or pigment yellow 155. When printed, the combination of these inks results in a red, red-orange, or orange colored image exhibiting substantially balanced indoor lightfastness, balanced ozonefastness, enhanced y chroma, or combinations thereof.

In an embodiment of the ink set including the scarlet ink with pigment red 168 and a gray ink, the pigment in the gray ink is generally a combination of pigments. In an embodiment, the combination includes effective amounts of pigment black 7, pigment violet 23 and pigment blue 15:3. As previously indicated, the effective amounts of the pigment(s) used to form the gray ink may depend on the desired shade (e.g., light gray, medium gray, dark gray) of the resulting ink. Non-limiting examples of such gray inks are described in U.S. patent application Ser. No. 11/290,094, filed on Nov. 30, 2005, incorporated by reference herein in its entirety.

In one non-limiting example of a dark gray ink, the effective amount of black pigment has a pigment load sufficient to provide an absorbance maxima ranging from about 0.24 to about 0.55 at a 1:2,500 dilution of the dark gray ink (e.g., pigment weight ranging from about 1 wt. % to about 3.5 wt. %); the effective amount of cyan pigment (i.e., pigment blue) has a pigment load sufficient to provide an absorbance maxima ranging from about 0.07 to about 0.2 at a 1:2,500 dilution of the dark gray ink (e.g., pigment weight ranging from about 0.2 wt. % to about 0.75 wt. %); and the effective amount of violet pigment has a pigment load sufficient to provide an absorbance maxima ranging from about 0.07 to about 0.18 at a 1:2,500 dilution of the dark gray ink (e.g., pigment weight ranging from about 0.19 wt. % to about 0.6 wt. %). In this example embodiment, the wavelength maxima for each of the absorbance measurements range from about 500 nm to about 615 nm.

In one non-limiting example of a light gray ink, the effective amount of black pigment has a pigment load sufficient to provide an absorbance maxima ranging from about 0.04 to about 0.11 at a 1:2,500 dilution of the light gray ink (e.g., pigment weight ranging from about 0.2 wt. % to about 0.65 wt. %); the effective amount of cyan pigment (i.e., pigment blue) has a pigment load sufficient to provide an absorbance maxima ranging from about 0.01 to about 0.03 at a 1:2,500 dilution of the light gray ink (e.g., pigment weight ranging from about 0.07 wt. % to about 0.15 wt. %); and the effective amount of violet pigment has a pigment load sufficient to provide an absorbance maxima ranging from about 0.01 to about 0.04 at a 1:2,500 dilution of the light gray ink (e.g., pigment weight ranging from about 0.03 wt. % to about 0.1 wt. %). In this example embodiment, the wavelength maxima for each of the absorbance measurements range from about 500 nm to about 615 nm.

In this embodiment, it is to be understood that various levels of gray ink (e.g., medium gray ink) may be achieved by altering the amounts of the black, cyan and violet pigments.

An image printed with a combination of the scarlet ink (including pigment red 168) and the gray ink (based on pigment black 7, pigment violet 23 and pigment blue 15:3) has a red to brown color, and exhibits substantially balanced indoor lightfastness, substantially balanced ozonefastness, or combinations thereof.

An alternate embodiment of the ink set disclosed herein includes a red ink which includes an effective amount of pigment red 254, and a neutral gray ink which includes effective amounts of black, cyan and magenta pigments. It is to be understood that the previously described ink vehicle(s) may be suitable for the scarlet and gray inks described in this embodiment.

In an embodiment, the effective amount of pigment red 254 in the red ink ranges from about 2 wt. % to about 6 wt. %. In another embodiment, the effective amount of pigment red 254 in the red ink is sufficient to provide an absorbance maxima ranging from about 0.5 to about 1.2 at a 1:2,500 dilution of the red ink, at a wavelength ranging from about 500 nm to about 600 nm.

Non-limiting examples of such gray inks formulated with black, cyan and magenta pigments are described in U.S. patent application Ser. No. 11/290,094, filed on Nov. 30, 2005, incorporated by reference herein in its entirety. In one non-limiting example of a dark gray ink, the effective amount of black pigment has a pigment load sufficient to provide an absorbance maxima ranging from about 0.23 to about 0.53 at a 1:2,500 dilution of the dark gray ink (e.g., pigment weight ranging from about 1 wt. % to about 3.1 wt. %); the effective amount of cyan pigment has a pigment load sufficient to provide an absorbance maxima ranging from about 0.1 to about 0.25 at a 1:2,500 dilution of the dark gray ink (e.g., pigment weight ranging from about 0.3 wt. % to about 1.1 wt. %); and the effective amount of magenta pigment has a pigment load sufficient to provide an absorbance maxima ranging from about 0.06 to about 0.16 at a 1:2,500 dilution of the dark gray ink (e.g., pigment weight ranging from about 0.4 wt. % to about 1.4 wt. %). In this example embodiment, the wavelength maxima for each of the absorbance measurements range from about 500 nm to about 615 nm.

In one non-limiting example of a light gray ink, the effective amount of black pigment has a pigment load sufficient to provide an absorbance maxima ranging from about 0.04 to about 0.11 at a 1:2,500 dilution of the light gray ink (e.g., pigment weight ranging from about 0.2 wt. % to about 0.65 wt. %); the effective amount of cyan pigment has a pigment load sufficient to provide an absorbance maxima ranging from about 0.01 to about 0.04 at a 1:2,500 dilution of the light gray ink (e.g., pigment weight ranging from about 0.02 wt. % to about 0.45 wt. %); and the effective amount of magenta pigment has a pigment load sufficient to provide an absorbance maxima ranging from about 0.01 to about 0.04 at a 1:2,500 dilution of the light gray ink (e.g., pigment weight ranging from about 0.1 wt. % to about 0.35 wt. %). In this example embodiment, the wavelength maxima for each of the absorbance measurements range from about 500 nm to about 615 nm.

In this embodiment, it is to be understood that various levels of gray ink (e.g., medium gray ink) may be achieved by altering the amounts of the black, cyan, and/or magenta pigments.

In an embodiment of a method of using embodiment(s) of the inkjet ink set, effective amounts of the scarlet ink or red ink and the other ink are established on at least a portion of a substrate to form an image. Generally, the inks are combined to form a secondary color, however, it is to be understood that at least some of the scarlet ink or red ink may be established on one area of the substrate and at least some of the other ink may be established on another area of the substrate.

Examples of suitable substrate materials include, but are not limited to plain papers, microporous photopapers, coated papers, glossy photopapers, semi-gloss photopapers, heavy weight matte papers, billboard papers, digital fine art papers, calendared papers, vinyl papers, or combinations thereof.

The image may include alphanumeric indicia, graphical indicia, or combinations thereof. Furthermore, the inks may be established substantially simultaneously or sequentially via inkjet printing techniques. Non-limiting examples of suitable inkjet printing techniques include piezoelectric inkjet printing, thermal inkjet printing, or combinations thereof.

The amount of each of the inks established via inkjet printing depends, at least in part, on the desirable color for the printed image. As such, an embodiment of the method includes changing the effective amount(s), that are to be established on the substrate, of the scarlet ink, the other ink, or combinations thereof in order to obtain a desired color of the printed image. In an embodiment of the ink set in which the scarlet ink and yellow ink are used, more scarlet ink may be established than yellow ink if a dark red-orange color is desirable. Similarly, less scarlet ink may be established than yellow ink if a lighter orange color is desirable.

As previously indicated, images printed with embodiments of the scarlet ink and yellow ink together and/or with embodiments of the scarlet ink or red ink and gray ink together exhibit balanced lightfastness and/or balanced ozonefastness. As such, the ink sets disclosed herein offer the ability to print single colored images using two different colored inks, where one of the inks advantageously does not substantially fade prior to the other of the inks.

To further illustrate embodiment(s) of the present disclosure, various examples are given herein. It is to be understood that these examples are provided for illustrative purposes and are not to be construed as limiting the scope of the disclosed embodiment(s).

EXAMPLES

The lightfastness/lifetimes for various yellow inks, gray inks and red or scarlet inks were measured. The results are provided in the following tables labeled Table 1, Table 2 and Table 3. The ozonefastness for various red or scarlet inks and gray inks was also measured. The results are provided in Table 4, Table 5 and Table 6. Specifically, Table 5 depicts the ozonefastness results for dark gray ink (G), medium gray ink (mg), and light gray ink (Ig) based on black, cyan and violet pigments. Table 6 depicts the ozonefastness results for dark gray inks based on black, cyan and magenta pigments.

In all of the following tables, the minimum lifetime measured for the various inks is provided. The optical densities of the inks were measured before and after light exposure. The optical density loss was calculated and converted to years to fade, according to the conventional Wilhelm Imaging Research criteria, version 3.0. The term "no fade" as used herein indicates that the ink fade point is too far out in time to be reliably measured.

TABLE 1

Lifetime/Lightfastness of Scarlet or Red Pigments

| Pigment | Loading (Wt. %) | Media | Minimum Lifetime (OD = 0.6) |
|---|---|---|---|
| PR168 | 4 | Heavy weight matte paper | 665 |
| PR177 | 4 | Heavy weight matte paper | 332 |
| PR208 | 4 | Heavy weight matte paper | 59 |
| PR254 - Type1 | 4 | Heavy weight matte paper | 348 |
| PR254 - Type2 | 4 | Heavy weight matte paper | 426 |
| PR168 | 4 | Micro-porous photopaper | 326 |
| PR177 | 4 | Micro-porous photopaper | 4 |
| PR208 | 4 | Micro-porous photopaper | 60 |
| PR254 - Type1 | 4 | Micro-porous photopaper | 142 |
| PR254 - Type2 | 4 | Micro-porous photopaper | 225 |
| PR177 | 4 | Digital fine art paper - Type1 | 169 |
| PR254 - Type1 | 4 | Digital fine art paper - Type1 | 259 |
| PR254- Type2 | 4 | Digital fine art paper - Type1 | 252 |
| PR168 | 4 | Digital fine art paper - Type2 | 400 |
| PR177 | 4 | Digital fine art paper - Type2 | 279 |
| PR208 | 4 | Digital fine art paper - Type2 | 43 |
| PR254 - Type1 | 4 | Digital fine art paper - Type2 | 256 |
| PR254 - Type2 | 4 | Digital fine art paper - Type2 | 362 |

TABLE 2

Lifetime/Lightfastness of Yellow Inks

| Pigment | Loading (Wt. %) | Media | Minimum Lifetime (OD = 0.6) |
|---|---|---|---|
| PY128 | 5 | Heavy weight matte paper | No Fade |
| PY155 | 5 | Heavy weight matte paper | 145 |
| PY74 | 4 | Heavy weight matte paper | 58 |
| PY74 | 4 | Heavy weight matte paper | 35 |
| PY93 | 5 | Heavy weight matte paper | 118 |
| PY128 | 5 | Digital fine art paper - Type2 | 1777 |
| PY155 | 5 | Digital fine art paper - Type2 | 126 |
| PY74 | 4 | Digital fine art paper - Type2 | 36 |
| PY74 | 4 | Digital fine art paper - Type2 | 30 |
| PY93 | 5 | Digital fine art paper - Type2 | 106 |
| PY128 | 5 | Micro-porous photopaper | 852 |
| PY155 | 5 | Micro-porous photopaper | 66 |
| PY74 | 4 | Micro-porous photopaper | 40 |
| PY74 | 4 | Micro-porous photopaper | 33 |
| PY93 | 5 | Micro-porous photopaper | 116 |
| PY128 | 5 | Digital fine art paper - Type1 | 1952 |
| PY155 | 5 | Digital fine art paper - Type1 | 110 |
| PY74 | 4 | Digital fine art paper - Type1 | 37 |
| PY74 | 4 | Digital fine art paper - Type1 | 31 |
| PY93 | 5 | Digital fine art paper - Type1 | 101 |

TABLE 3

Lifetime/Lightfastness of Gray Inks

| Media | Pigment Blend | Minimum Lifetime (OD = 0.6) |
|---|---|---|
| Digital fine art paper - Type1 | Black, Cyan, Magenta ("KCM") | 62 |
| Digital fine art paper - Type1 | Black, Cyan, Violet ("KCV") | 198 |
| Digital fine art paper - Type2 | KCM | 65 |
| Digital fine art paper - Type2 | KCV | 638 |
| Micro-porous photopaper | KCM | No fade |
| Micro-porous photopaper | KCV | 628 |
| Heavy weight matte paper | KCM | 270 |
| Heavy weight matte paper | KCV | 479 |
| Digital fine art paper - Type1 | KCM | 62 |
| Digital fine art paper - Type1 | KCV | 116 |
| Digital fine art paper - Type2 | KCM | 71 |
| Digital fine art paper - Type2 | KCV | 326 |
| Micro-porous photopaper | KCM | 244 |
| Micro-porous photopaper | KCV | 248 |
| Heavy weight matte paper | KCM | 401 |
| Heavy weight matte paper | KCV | 247 |

TABLE 4

Lifetime/Ozonefastness of Scarlet or Red Inks

| Pigment | Loading (Wt. %) | Media | Minimum Lifetime (OD = 0.6) |
|---|---|---|---|
| PR168 | 4 | Heavy weight matte paper | No fade |
| PR177 | 4 | Heavy weight matte paper | 66 |
| PR208 | 4 | Heavy weight matte paper | 75 |
| PR254 - Type1 | 4 | Heavy weight matte paper | 41 |
| PR254 - Type2 | 4 | Heavy weight matte paper | 44 |
| PR168 | 4 | Micro-porous photopaper | No fade |
| PR177 | 4 | Micro-porous photopaper | 127 |
| PR208 | 4 | Micro-porous photopaper | 54 |
| PR254 - Type1 | 4 | Micro-porous photopaper | 42 |
| PR254 - Type2 | 4 | Micro-porous photopaper | 44 |
| PR168 | 4 | Digital fine art paper - Type2 | No fade |
| PR177 | 4 | Digital fine art paper - Type2 | 112 |
| PR208 | 4 | Digital fine art paper - Type2 | 45 |
| PR254 - Type1 | 4 | Digital fine art paper - Type2 | 31 |
| PR254 - Type2 | 4 | Digital fine art paper - Type2 | 43 |

TABLE 5

Lifetime/Ozonefastness of KCV Gray Ink

| Pigment | Loading (G, mg, Ig) | Media | Minimum Lifetime (OD = 0.6) |
|---|---|---|---|
| KCV | Ig | Heavy weight matte paper | 139 |
| KCV | mg | Heavy weight matte paper | 132 |
| KCV | G | Heavy weight matte paper | 164 |
| KCV | Ig | Micro-porous photopaper | 94 |
| KCV | mg | Micro-porous photopaper | 92 |
| KCV | G | Micro-porous photopaper | 93 |
| KCV | Ig | Digital fine art paper - Type2 | 93 |
| KCV | mg | Digital fine art paper - Type2 | 88 |
| KCV | G | Digital fine art paper - Type2 | 102 |

TABLE 6

Lifetime/Ozonefastness of KCM Gray Ink

| Pigment | Loading (total pigment wt. %) | Media | Minimum Lifetime (OD = 0.6) |
|---|---|---|---|
| KCM | 0.49 | Heavy weight matte paper | 31.2 |
| KCM | 0.65 | Heavy weight matte paper | 29.3 |
| KCM | 0.76 | Heavy weight matte paper | 33.0 |
| KCM | 2.31 | Heavy weight matte paper | 58.0 |
| KCM | 3.08 | Heavy weight matte paper | 58.1 |
| KCM | 3.62 | Heavy weight matte paper | 64.7 |
| KCM | 0.49 | Digital fine art paper - Type2 | 14.2 |
| KCM | 0.65 | Digital fine art paper - Type2 | 15.3 |
| KCM | 0.76 | Digital fine art paper - Type2 | 17.8 |
| KCM | 2.31 | Digital fine art paper - Type2 | 34.6 |
| KCM | 3.08 | Digital fine art paper - Type2 | 34.8 |
| KCM | 3.62 | Digital fine art paper - Type2 | 36.6 |
| KCM | 0.49 | Micro-porous photopaper | 35.3 |
| KCM | 0.65 | Micro-porous photopaper | 35.8 |
| KCM | 0.76 | Micro-porous photopaper | 35.0 |
| KCM | 2.31 | Micro-porous photopaper | 42.9 |
| KCM | 3.08 | Micro-porous photopaper | 44.8 |
| KCM | 3.62 | Micro-porous photopaper | 46.2 |
| KCM | 0.49 | Digital fine art paper - Type1 | 15.5 |
| KCM | 0.65 | Digital fine art paper - Type1 | 15.2 |
| KCM | 0.76 | Digital fine art paper - Type1 | 17.8 |
| KCM | 2.31 | Digital fine art paper - Type1 | 37.8 |
| KCM | 3.08 | Digital fine art paper - Type1 | 40.1 |
| KCM | 3.62 | Digital fine art paper - Type1 | 44.0 |

The above data indicates that PR168 has substantially balanced lightfastness with PY93, PY155 and substantially balanced lightfastness and ozonefastness with KCV, as these inks generally exhibit medium/good (e.g., fade between 50 and 150 years) to excellent (e.g., fade after 150 years or "no fade") results. While the ozonefastness data of PR254 is not excellent, it is similar to the ozonefastness data for KCM, particularly the results for the higher loading KCM gray inks on microporous photo paper and on digital fine art paper-type 2. As such, it is believed that PR254 and KCM provides an ink combination that offers substantially balanced fade.

While several embodiments have been described in detail, it will be apparent to those skilled in the art that the disclosed embodiments may be modified. Therefore, the foregoing description is to be considered exemplary rather than limiting.

What is claimed is:

1. An inkjet ink set, comprising:
    a scarlet ink consisting essentially of an ink vehicle and an effective amount of pigment red 168; and
    another ink, the other ink being a) a gray ink including an ink vehicle and an effective amount of at least one other pigment or b) a yellow ink including an ink vehicle and an effective amount of pigment yellow 213, or a combination of pigment yellow 213 and at least one of pigment yellow 128, pigment yellow 110, pigment yellow 150, pigment yellow 151, pigment yellow 93 or pigment yellow 155.

2. The inkjet ink set as defined in claim 1 wherein the effective amount of pigment red 168 has a pigment load sufficient to provide an absorbance maxima at a wavelength maxima ranging from about 480 nm to about 580 nm, the absorbance maxima ranging from about 0.075 to about 1.2 at a 1:2,500 dilution of the scarlet ink.

3. The inkjet ink set as defined in claim 1, a wherein the yellow ink has a pigment load with an absorbance maxima ranging from about 0.200 to about 4.000 at a 1:2500 dilution and at a wavelength maxima ranging from about 320 nm to about 480 nm.

4. The inkjet ink set as defined in claim 1 wherein the yellow ink includes pigment yellow 213 combined with a pigment selected from the group consisting of pigment yellow 128, pigment yellow 110, pigment yellow 150, pigment yellow 151 and combinations thereof, and wherein a printed image having effective amounts of the scarlet ink and the yellow ink exhibits at least one of enhanced chroma, substantially balanced window lightfastness, substantially balanced indoor lightfastness, or combinations thereof.

5. The inkjet ink set as defined in claim 1 wherein the yellow ink includes pigment yellow 213 combined with a pigment selected from pigment yellow 93 and pigment yellow 155, and wherein a printed image having effective amounts of the scarlet ink and the yellow ink exhibits at least one of substantially balanced indoor lightfastness, substantially balanced ozonefastness, enhanced chroma, or combinations thereof.

6. The inkjet ink set as defined in claim 1 wherein the at least one other pigment in the gray ink includes a combination of pigment black 7, pigment violet 23, and pigment blue 15:3.

7. The inkjet ink set as defined in claim 6 wherein a printed image having effective amounts of the scarlet ink and the gray ink exhibits at least one of substantially balanced indoor lightfastness, substantially balanced ozonefastness, or combinations thereof.

8. The inkjet ink set as defined in claim 1 wherein at least one of the scarlet ink, the gray ink or the yellow ink is an aqueous based ink, an organic based ink, or combinations thereof.

9. The inkjet ink set as defined in claim 1 wherein the ink vehicle in at least one of the scarlet ink, the gray ink or the yellow ink comprises a component selected from the group consisting of water soluble polymers, non-ionic surfactants, glyceryl polyoxyethyl ethers, pyrrolidones, glycerols, diethylene glycol, 1,2-hexanediol, ethoxylated nonionic fluorosurfactants, biocides, triethanolamine, and combinations thereof.

10. The inkjet ink set as defined in claim 1 wherein an image printed having effective amounts of the scarlet ink and either the gray ink or the yellow ink exhibits a color ranging from scarlet, to orange, to brown, to combinations thereof.

11. A method of utilizing an inkjet ink set, the inkjet ink set comprising: a scarlet ink consisting essentially of an ink vehicle and an effective amount of pigment red 168; and another ink, the other ink being a) a gray ink including an ink vehicle and an effective amount of at least one other pigment or b) a yellow ink including an ink vehicle and an effective amount of pigment yellow 213, or a combination of pigment yellow 213 and at least one of pigment yellow 128, pigment yellow 110, pigment yellow 150, pigment yellow 151, pigment yellow 93 or pigment yellow 155; the method comprising:
a step of establishing effective amounts of each of the scarlet ink and the other ink on at least a portion of a substrate.

12. The method as defined in claim 11 wherein the step of establishing is accomplished via printing each of the scarlet ink and the other ink using one of thermal inkjet printing, piezoelectric inkjet printing, or combinations thereof.

13. The method as defined in claim 11 wherein the substrate is selected from the group consisting of plain paper, microporous photopaper, coated paper, glossy photopaper, semi-gloss photopaper, heavy weight matte paper, billboard paper, digital fine art paper, calendared paper, vinyl paper, and combinations thereof.

14. A method of forming an image on a substrate, comprising:
establishing an effective amount of a scarlet ink on at least a portion of the substrate, the scarlet ink consisting essentially of an ink vehicle and an effective amount of pigment red 168; and
establishing an effective amount of another ink, the other ink being a) a gray ink including an ink vehicle and an effective amount of at least one other pigment or b) a yellow ink including an ink vehicle and an effective amount of pigment yellow 213, or a combination of pigment yellow 213 and at least one of pigment yellow 128, pigment yellow 110, pigment yellow 150, pigment yellow 151, pigment yellow 93 or pigment yellow 155.

15. The method as defined in claim 14 wherein the pigment red 168 is in the form of solid pigment particles, and wherein the effective amount of pigment red 168 has a pigment load sufficient to provide an absorbance maxima at a wavelength maxima ranging from about 480 nm to about 580 nm, the absorbance maxima ranging from about 0.075 to about 1.2 at a 1:2,500 dilution of the scarlet ink.

16. The method as defined in claim 14 wherein the other ink is a yellow ink having a pigment load with an absorbance maxima ranging from about 0.200 to about 4.000 at a 1:2500 dilution and at a wavelength maxima ranging from about 320 nm to about 480 nm.

17. The method as defined in claim 14 wherein the yellow ink includes pigment yellow 213 combined with a pigment selected from the group consisting of pigment yellow 128, pigment yellow 93, pigment yellow 155, pigment yellow 110, pigment yellow 150, pigment yellow 151, and combinations thereof.

18. The method as defined in claim 14 wherein the at least one other pigment in the gray ink includes a combination of pigment black 7, pigment violet 23, and pigment blue 15:3.

19. An inkjet ink set, comprising:
a red ink including an ink vehicle and an effective amount of pigment red 254; and
a gray ink including an ink vehicle and effective amounts of black pigment, magenta pigment and cyan pigment.

20. An inkjet ink set, comprising:
a scarlet ink including an ink vehicle and an effective amount of pigment red 168; and
another ink, the other ink being a) a gray ink including an ink vehicle and an effective amount of at least one other pigment or b) a yellow ink including an ink vehicle and an effective amount of pigment yellow 213, or a combination of pigment yellow 213 and at least one of pigment yellow 128, pigment yellow 110, pigment yellow 150, pigment yellow 151, pigment yellow 93 or pigment yellow 155.

21. The inkjet ink set as defined in claim 20 wherein the scarlet ink further includes effective amounts of at least one other pigment selected from the group consisting of yellow pigments, scarlet pigments, magenta pigments, and combinations thereof.

* * * * *

UNITED STATES PATENT AND TRADEMARK OFFICE
CERTIFICATE OF CORRECTION

PATENT NO. : 7,476,271 B2 Page 1 of 1
APPLICATION NO. : 11/496186
DATED : January 13, 2009
INVENTOR(S) : Howard A. Doumaux et al.

It is certified that error appears in the above-identified patent and that said Letters Patent is hereby corrected as shown below:

In column 6, line 1, delete "(Ig)" and insert -- (lg) --, therefor.

In column 7, line 57, delete "Ig" and insert -- lg --, therefor.

In column 7, line 58, delete "Ig" and insert -- lg --, therefor.

In column 7, line 61, delete "Ig" and insert -- lg --, therefor.

In column 7, line 64, delete "Ig" and insert -- lg --, therefor.

In column 8, line 66, in Claim 3, delete "claim 1, a" and insert -- claim 1 --, therefor.

Signed and Sealed this

Fifteenth Day of June, 2010

David J. Kappos
*Director of the United States Patent and Trademark Office*